United States Patent
Kaufman et al.

[11] 3,812,379
[45] May 21, 1974

[54] GASOLINE ENGINE AND ELECTRIC MOTOR SYSTEM FOR BOATS OR THE LIKE

[76] Inventors: Bernard Kaufman, 2708 Healy Ave., Far Rockaway, N.Y. 11691; William Kitovich, 233 Chicopee, Chicopee Falls, Mass. 01013

[22] Filed: Aug. 4, 1972
(Under Rule 47)

[21] Appl. No.: 277,986

[52] U.S. Cl. ............ 290/50, 290/43, 290/54, 290/1, 115/.5
[51] Int. Cl. ............................ B60l 11/12
[58] Field of Search ........ 290/54, 50, 43, 1; 115/.5, 115/18 E, 17, 34

[56] References Cited
UNITED STATES PATENTS

| | | | |
|---|---|---|---|
| 3,703,642 | 11/1972 | Balaguer | 290/43 |
| 2,504,833 | 4/1950 | Hann | 290/46 |
| 1,915,982 | 6/1933 | Doman | 290/46 X |
| 3,238,911 | 3/1966 | Puzulski | 290/43 |
| 3,619,632 | 11/1971 | Labombarde | 290/43 |

*Primary Examiner*—G. Simmons
*Attorney, Agent, or Firm*—Leonard H. King

[57] ABSTRACT

A combination propulsion system for boats or the like is provided comprising a first, gasoline engine, a second, electric motor and means for coupling the motor to the engine whereby the electric motor may be reversed and used as a generator when the gasoline engine is running for recharging a battery.

9 Claims, 6 Drawing Figures

PATENTED MAY 21 1974 3,812,379

GASOLINE ENGINE AND ELECTRIC MOTOR SYSTEM FOR BOATS OR THE LIKE

BACKGROUND OF THE INVENTION

1. Field of the Invention

This invention relates generally to propulsion means for boats or the like and more particularly to a system utilising a pair of motors, one of which is electrically driven and the other of which uses gasoline as the fuel together with means for coupling the two motors.

2. Description of the Prior Art

Small boats utilizing outboard engines are quite common place today. They are used for fishing and for aquatic sports. Generally speaking the outboard engine most commonly used today requires gasoline as its fuel. However, in many instances it is desirable to use an electric motor in order to minimize the noise of the conventional internal combustion engine. The electric motor is advantageous, for example, when fishing and particularly when trolling where quiet operation is essential. While it is a relatively simple matter, to store additional fuel for an internal combustion engine, it is much more difficult to provide power for long periods of time for an electric motor. Normally, a 6 or 12 volt battery adapted to power an electric outboard motor for any appreciable length of time would be too large to be practical.

SUMMARY OF THE INVENTION

In its broadest aspect, the present invention provides a system wherein an electric motor or a gasoline engine may be selectively used depending upon the requirement of the owner. Both the electric motor and the gasoline engine are interchangeable on the motor mount that is secured to the boat. A clamp ring is used to mount either the electric motor or the gasoline engine to the shaft to which the propeller is coupled. In addition, a support plate or stand is provided having a tubular column extending therethrough. Means within the tubular column are used to mount and to couple the electric motor and the gasoline engine to each other. While the electric motor is reversed it acts as a generator which can be electrically connected to a battery so that the battery may be charged or re-charged. Thus, the boat owner is always assured of having a fully charged battery so that the electric motor may be used when the conditions warrent it, for example, to run lights, bilge pump, electrical appliances, etc., or when trolling.

Accordingly, it is an important object of the present invention to provide an improved outboard motor system that may use either an electric or a gasoline engine.

It is further object of the present invention to provide means for coupling a gasoline engine and an electric motor so that the electric motor may be used as a generator for re-charging a battery.

It is an additional object of the present invention to provide an outboard motor system, as described above, that is self-supporting and of relatively low cost.

These and other objects, features and advantages of the invention will, in part, be pointed out with particularity, and will, in part, become obvious from the following more detailed description of the invention, taken in conjunction with the accompanying drawing, which forms intregal part thereof.

BRIEF DESCRIPTION OF THE DRAWING

In the various figures of the drawing like reference characters designate like parts.

In the drawing.

DESCRIPTION OF THE PREFERRED EMBODIMENT

Figure 1:
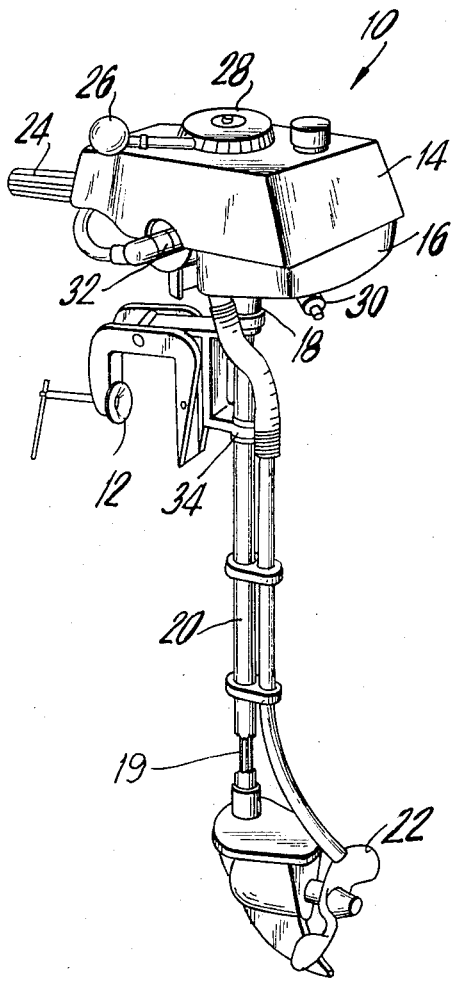
FIG. 1 is a perspective view of a typical gasoline engine that may be used with the present invention.

Referring now to FIG. 1, there is shown a typical, tiltable gasoline engine generally designated by the reference character 10. The term "gasoline engine" is used generically herein and refers to an internal combustion engine. Clamp means 12 are used to secure the engine 10 to a boat (not shown). The motor housing 14 includes a gasoline tank 16 and a split clamp means 18 that are used to removably secure the output shaft 10a of the motor 10 to a drive shaft 19 which is contained within an elongated tubular member 20. A propeller 22 is suitably coupled to the drive shaft 19 in any conventional manner. Conventional components such as a throttle control 24, a positive rewind starter 26, an enclosed fly wheel 28, a muffler 30, a spark plug 32 and shaft height adjustment means 34 are also provided.

Figure 2:
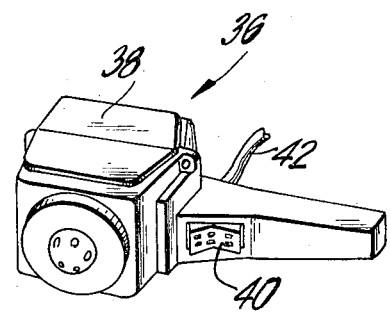
FIG. 2 is a perspective view of a typical electric motor that may be used with the present invention.
Figure 3:
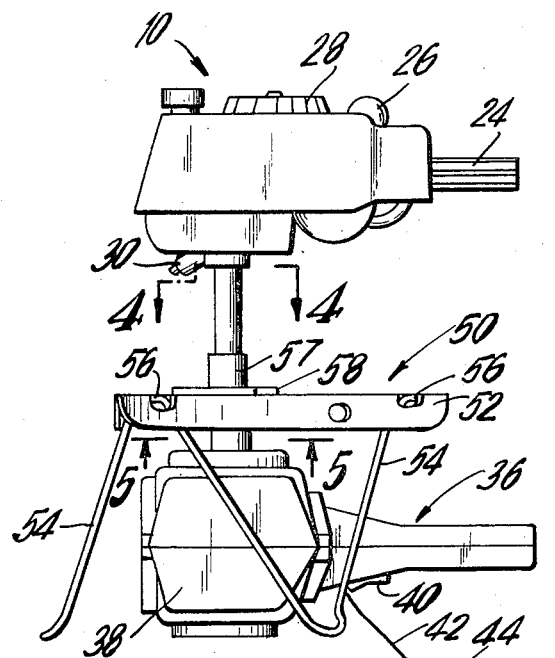
FIG. 3 is an elevational view illustrating the gasoline engine and the electric motor together with the coupling means therefor.

FIG. 2 illustrates a typical electric motor 36 that includes an output shaft 36a and a housing 38. The electric motor 36 is reversible and is provided with a switch 40 having three positions one of which is "off," the others being "forward" and "reverse." As shown in FIG. 3, cable means 42 have clamps 44 and 46 at the end thereof to thereby permit coupling of the electric motor 36 to a battery. The electric motor 36 may be substituted, as the occasion demands, for the gasoline engine 10 using the split clamp means 18.

Figure 4:
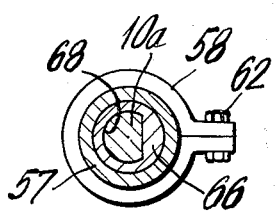
FIG. 4 is a transverse, sectional plan view taken along line 4—4 of FIG. 3 with portions omitted for clarity.
Figure 5:
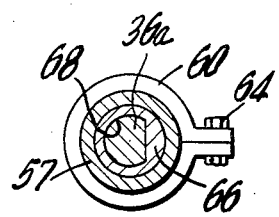
FIG. 5 is a transverse, sectional plan view taken along line 5—5 of FIG. 3 with portions omitted for clarity.
Figure 6:
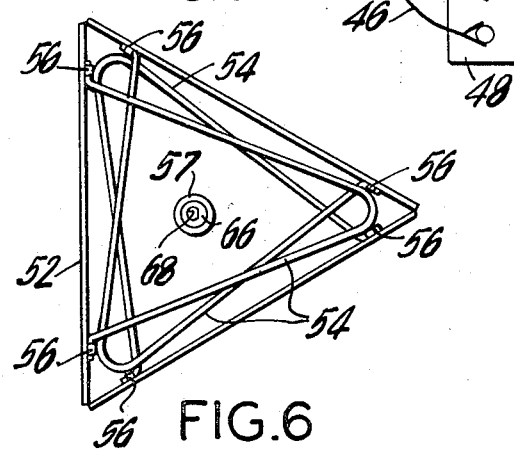
FIG. 6 is a bottom plan view of the coupling means shown in FIG. 3 with portions omitted for clarity and with the legs thereof in the collapsed condition.

For purposes to be described hereinafter, both the gasoline engine 10 and the electric motor 36 have D-shaped output shafts 10a and 36a (FIGS. 4 and 5, respectively).

Turning now specifically to FIG. 3, there is shown the manner in which the present invention may be used. A stand 50 is comprised of a plate portion 52 having a plurality of legs 54 extending downwardly therefrom. Preferably the legs 54 are hinged such as shown by the reference characters 56 to the plate portion 52, so that, when not in use, the stand 50 may be folded into a compact condition. It should be understood that other means may be used for securing the legs 54 to the plate portion 52 and other means may be used for compacting the stand 38. For example, the legs 54 may be of the telescoping type or they may be completely removable and readily attachable to the plate portion 52.

A tubular column 57 is secured to the plate portion 52 by means of a collar 58 or the like. As shown in FIG. 3, the column 57 extends above and below the plane of the plate portion 52 and is provided with split clamp means 58 and 60 at the upper and lower ends, respectively, thereof, and screws 62 and 64. Internally of the column 57 there is provided a D-shaped bore adapted to receive the output shaft 10a of the gasoline engine 10 and the output shaft 36a of the electric motor 36. In the embodiment illustrated the D-shaped openings are formed by a tubular member 66 having the required D-shaped bore 68 therein. The tubular member 66 may be secured within tubular column 56 in any convenient manner.

The gasoline engine 10 may be used in its conventional manner as shown in FIG. 1. However, when trolling or at any other time when the noise of a gasoline engine 10 is considered to be objectionable, the gasoline engine 10 may be removed and may be replaced by the electric motor 36 merely by loosening and tightening the clamp 18 shown in FIG. 1. In order to assure a full charge on the battery 48 so that the electric motor 36 may be used, the gasoline engine 10 is mounted on the column 57 by means of the split clamp means 58 and the screw 62. The electric motor 36 is also mounted on the column 57 beneath the plate 52 by means of the split clamp 60 and the screw 64 and then the electric motor 36 is placed in the "reverse" operating condition and driven by the gasoline motor 10. When in the "reverse" operating condition, the electric motor 36 operates as a generator and may thereby charge the battery 48 through the cable means 42 and the clamp means 44 and 46. When the battery 48 is fully charged, the electric motor 36 may be used with the boat or may be used to run lights, pumps, electrical appliances, etc.

From the foregoing it will be evident that an improved outboard system has been provided. A reversible DC electrical motor is coupled to a battery and is driven by a gasoline engine in order to charge the battery. Thus, at convenient times, such as during the night or any other time when the gasoline engine is not being used, the battery may be brought up to its full charge using the electric motor as a generator. Both the electric motor and the gasoline engine are readily removable from and attachable to a boat and both the electrical motor and the gasoline engine are readily removable from and attachable to a support member that is used when the battery is to be charged. It will be appreciated that by using the combination gasoline engine and electrical motor a battery can easily be charged at any convenient time to thereby provide a readily usable source of power either for an outboard motor or for other electricity consuming applications.

It should be further noted that means other than D-shaped bores and D-shaped output shafts may be used for keying purposes. Although somewhat more expensive to fabricate, mating splines may also be used as may various forms of removable pins. As noted above, different types of legs may be used together with different folding or collapsing means. In addition, the legs may be replaced by a housing that is large enough for storage purposes.

It has been disclosed heretofore the best embodiment of the invention presently contemplated. However, it is to be understood that various changes and modifications may be made thereto without departing from the spirit of the invention.

What we claim as new and desire to secure by letters Patent is:

1. A combined boat propulsion and battery charging system comprising:
   a. a propeller;
   b. a drive shaft coupled to said propeller;
   c. an internal combustion engine provided with an output shaft adapted to be selectively and removably coupled to said drive shaft;
   d. a reversible, electrically energizable motor means having an output shaft adapted to be selectively and removably coupled to said drive shaft when said output shaft of said engine is not coupled to said drive shaft;
   e. first coupling means adapted for securing said output shaft of said engine and said motor means to each other for driving said motor means with said engine for generating electrical energy; and
   f. second coupling means for securing either said engine or said motor means to said drive shaft in order to provide means for propelling the boat when said first coupling means is not being used.

2. The system in accordance with claim 1 wherein there is further included support means for mounting said motor and engine in a coupled relationship.

3. The system in accordance with claim 1 wherein said coupling means comprises a tubular column for receiving said output shafts of said engine and said motor means at the opposite ends thereof.

4. The system in accordance with claim 1 wherein there is further included means for keying said output shafts of said engine and said motor means to said coupling means.

5. The system in accordance with claim 3 wherein said output shafts of said engine and said motor means are at least partially D-shaped and said tubular column includes mating D-shaped bores at least at the ends thereof.

6. The system in accordance with claim 1 wherein there is further included a stand for supporting said engine and motor when coupled together.

7. The system in accordance with claim 6 wherein said stand comprises a plate and leg means depending from said plate, said coupling means extending through said plate.

8. The system in accordance with claim 7 wherein said leg means are foldably secured to said plate.

9. The system in accordance with claim 1 wherein said internal combustion engine is gasoline fueled.

* * * * *